United States Patent
Tojo et al.

(10) Patent No.: US 10,762,372 B2
(45) Date of Patent: Sep. 1, 2020

(54) IMAGE PROCESSING APPARATUS AND CONTROL METHOD THEREFOR

(71) Applicant: CANON KABUSHIKI KAISHA, Tokyo (JP)

(72) Inventors: Hiroshi Tojo, Fuchu (JP); Kotaro Yano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 92 days.

(21) Appl. No.: 16/042,650

(22) Filed: Jul. 23, 2018

(65) Prior Publication Data

US 2019/0042869 A1 Feb. 7, 2019

(30) Foreign Application Priority Data

Aug. 2, 2017 (JP) ................. 2017-150083

(51) Int. Cl.
| | | |
|---|---|---|
| G06K 9/00 | (2006.01) | |
| G06K 9/32 | (2006.01) | |
| G06T 7/73 | (2017.01) | |
| H04N 5/232 | (2006.01) | |
| G06K 9/46 | (2006.01) | |

(52) U.S. Cl.
CPC ....... G06K 9/3241 (2013.01); G06K 9/00771 (2013.01); G06K 9/4604 (2013.01); G06K 9/4652 (2013.01); G06T 7/73 (2017.01); H04N 5/23229 (2013.01)

(58) Field of Classification Search
CPC ............. G06K 9/3241; G06K 9/00771; G06K 9/4604; G06K 9/4652; G06T 7/73; H04N 5/23229
See application file for complete search history.

(56) References Cited

U.S. PATENT DOCUMENTS

| | | | |
|---|---|---|---|
| 7,680,339 B2 | 3/2010 | Tojo | 382/199 |
| 8,787,629 B2 | 7/2014 | Kaneda et al. | 382/118 |
| 8,923,554 B2 | 12/2014 | Yano | 382/103 |
| 8,929,595 B2 | 1/2015 | Suzuki et al. | 382/103 |
| 9,036,863 B2 | 5/2015 | Yano | G06K 9/6262 |
| 9,036,917 B2 | 5/2015 | Kaneda et al. | G06K 9/4642 |

(Continued)

OTHER PUBLICATIONS

"Linear colour correction for multiple illumination changes and non-overlapping cameras"; Juan Torres, Klamer Schutte, Henri Bouma, Jose-Manuel Menéndez (Year: 2015).*

(Continued)

*Primary Examiner* — Khai M Nguyen
(74) *Attorney, Agent, or Firm* — Venable LLP (57) ABSTRACT

An image processing apparatus inputs a first and a second captured videos; extracts attribute values of image regions of background objects commonly included in the first and the second captured videos respectively; extracts attribute values of image regions of objects respectively included in the first and the second captured videos; derives a relative index of an attribute value of the image region of the object with reference to the attribute value of the image region of the background object with respect to the object included in each of the first and the second captured videos; and detects the same object included in the first and the second captured videos based on the index derived with respect to the object included in each of the first and the second captured videos.

11 Claims, 10 Drawing Sheets

(56) References Cited

U.S. PATENT DOCUMENTS

| | | | |
|---|---|---|---|
| 9,098,748 B2* | 8/2015 | Yano | G06K 9/00771 |
| 9,147,105 B2 | 9/2015 | Sagawa et al. | G06K 9/00221 |
| 9,202,126 B2 | 12/2015 | Tojo | G06K 9/3241 |
| 9,245,206 B2* | 1/2016 | Nomoto | G06K 9/6267 |
| 9,633,264 B2 | 4/2017 | Yano et al. | G06K 9/00771 |
| 9,934,446 B2 | 4/2018 | Yano et al. | G06K 9/3241 |
| 9,996,554 B2 | 6/2018 | Yano et al. | G06F 17/30247 |
| 2007/0237387 A1 | 10/2007 | Avidan et al. | 382/159 |
| 2012/0133773 A1* | 5/2012 | Brogren | G06K 9/00369 348/159 |
| 2013/0271667 A1 | 10/2013 | Tojo | H04N 5/147 |
| 2016/0050368 A1* | 2/2016 | Seo | G06T 7/11 348/36 |
| 2016/0055651 A1* | 2/2016 | Oami | G06K 9/00771 348/143 |

OTHER PUBLICATIONS

Y. Cai and M. Pietik, "Person Re-identification Based on Global Color Context", The Tenth International Workshop on Visual Surveillance (2010).

Stauffer C and Grimson W.E.L., "Adaptive background mixture models for real-time tracking", In Proceedings. 1999 IEEE Computer Society Conference on Computer Vision and Pattern Recognition (Cat. No. PR00149), IEEE Comput. Soc. Part vol. 2, 1999.

Extended European Search Report dated Dec. 14, 2018 in counterpart European Application No. 18180715.7.

Torres, Juan et al.: " Linear Colour Correction for Multiple Illumination Changes and Non-Overlapping Cameras", IET Image Process, IET, UK, vol. 9, No. 4, Apr. 1, 2015 (Apr. 1, 2015); pp. 280-289, XP006051547, ISSN: 1751-9659, DOI: 10.1049/IET-IPR.2014.0149.

* cited by examiner

IMAGE PROCESSING APPARATUS AND CONTROL METHOD THEREFOR

BACKGROUND OF THE INVENTION

Field of the Invention

The present invention relates to a technique of identifying an object from a plurality of videos.

Description of the Related Art

There is disclosed a technique of detecting a person region from a camera's video, obtaining information (attribute information) associated with attributes such as a clothing color and luminance from the person region, and comparing attribute information to determine (that is, identify) whether the person in the video is identified. According to, for example, Y. Cai and M. Pietik, "Person Re-identification Based on Global Color Context", The Tenth International Workshop on Visual Surveillance (2010), attribute information is extracted in advance from a person in a plurality of camera's videos, and the pieces of attribute information of the objects between the cameras are compared to identify the person. Associating persons identified between cameras with each other can implement tracking of a person across the cameras. In addition, storing in a storage unit videos captured by a plurality of cameras and attribute information in association with each other makes it possible to search for a person designated by a user from videos obtained in the past.

When, however, an object is shot by cameras, shot videos of even the same object may vary in attribute information such as color and luminance depending on differences in illumination condition and model. This poses a problem in that when an object is shot by a plurality of cameras or under different conditions, deterioration occurs in the accuracy in identifying the object.

SUMMARY OF THE INVENTION

According to one aspect of the present invention, an image processing apparatus comprises: an input unit configured to input a first captured video and a second captured video; a first extraction unit configured to extract attribute values of image regions of background objects commonly included in the first captured video and the second captured video respectively from the first captured video and the second captured video; a second extraction unit configured to extract attribute values of image regions of objects respectively included in the first captured video and the second captured video; a deriving unit configured to derive a relative index of an attribute value of the image region of the object with reference to the attribute value of the image region of the background object with respect to the object included in each of the first captured video and the second captured video; and a detection unit configured to detect the same object included in the first captured video and the second captured video based on the index derived with respect to the object included in each of the first captured video and the second captured video.

The present invention provides a technique that makes it possible to identify an object with higher accuracy with respect to a plurality of captured videos.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

An embodiment of the present invention will be described in detail below with reference to the accompanying drawings. Note that the following embodiment is merely an example of an embodiment of the present invention, and does not limit the scope of the present invention.

First Embodiment

The first embodiment of an image processing apparatus according to the present invention will exemplify an image processing system that identifies an object from videos obtained by cameras.

<System Arrangement>

Figure 1:
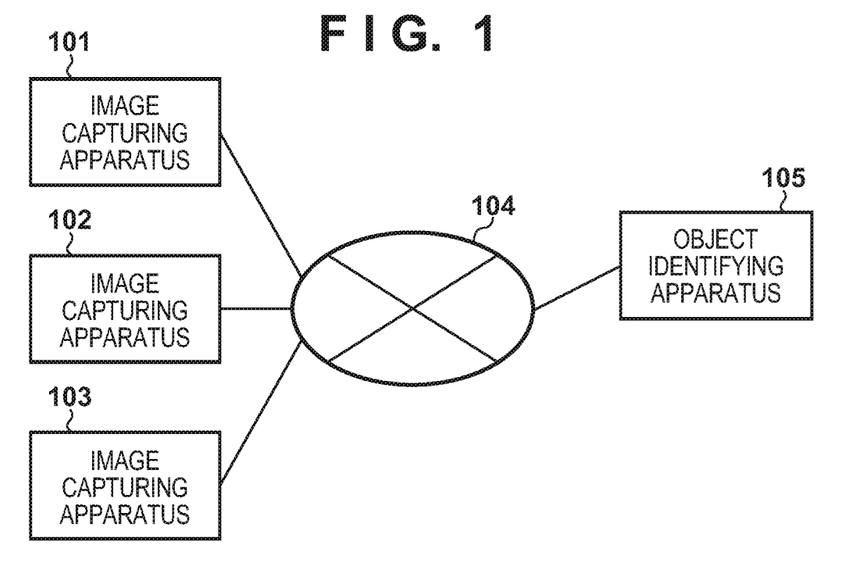
FIG. 1 is a view showing the arrangement of an image processing system according to the first embodiment.

FIG. 1 is a view showing the arrangement of the image processing system according to the first embodiment. The image processing system includes image capturing apparatuses (cameras) 101 to 103 communicably connected to each other via a network 104 and an object identifying apparatus 105.

The image capturing apparatuses 101 to 103 each are an apparatus constituted by an imaging lens and an image sensor such as a CCD or CMOS and configured to capture videos. The image capturing apparatuses 101 to 103 transmit captured videos to the object identifying apparatus 105 via the network 104. The object identifying apparatus 105 is an apparatus that identifies an object appearing in the image capturing range of each image capturing apparatus based on the videos received via the network.

Figure 2:
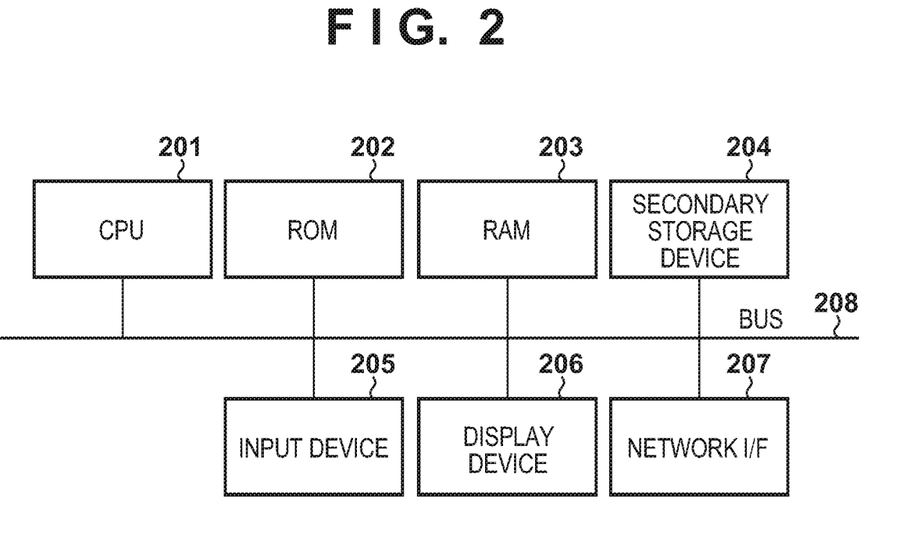
FIG. 2 is a block diagram showing the hardware arrangement of an object identifying apparatus.

FIG. 2 is a block diagram showing the hardware arrangement of the object identifying apparatus 105. A CPU 201 executes instructions based on programs and data stored in a ROM 202 and a RAM 203. The ROM 202 is a nonvolatile memory, which stores programs for implementing various functions (to be described below) and programs and data necessary for other control operations. The RAM 203 is a volatile memory, which stores temporary data such as frame image data and pattern discrimination results.

A secondary storage device 204 is a rewritable storage device such as a hard disk drive or flash memory, which stores image information, image processing programs, and various setting contents. The CPU 201 executes programs by transferring these pieces of information to the RAM 203.

An input device 205 includes a keyboard and a mouse and allows the user to perform an input operation. A display device 206 is a CRT display, liquid crystal display, or the like and displays processing results and the like to the user. A network I/F 207 is a modem, LAN, or the like, which connects to a network such as the Internet or an intranet. A bus 208 connects these devices to input and output data to and from each other.

Figure 3:
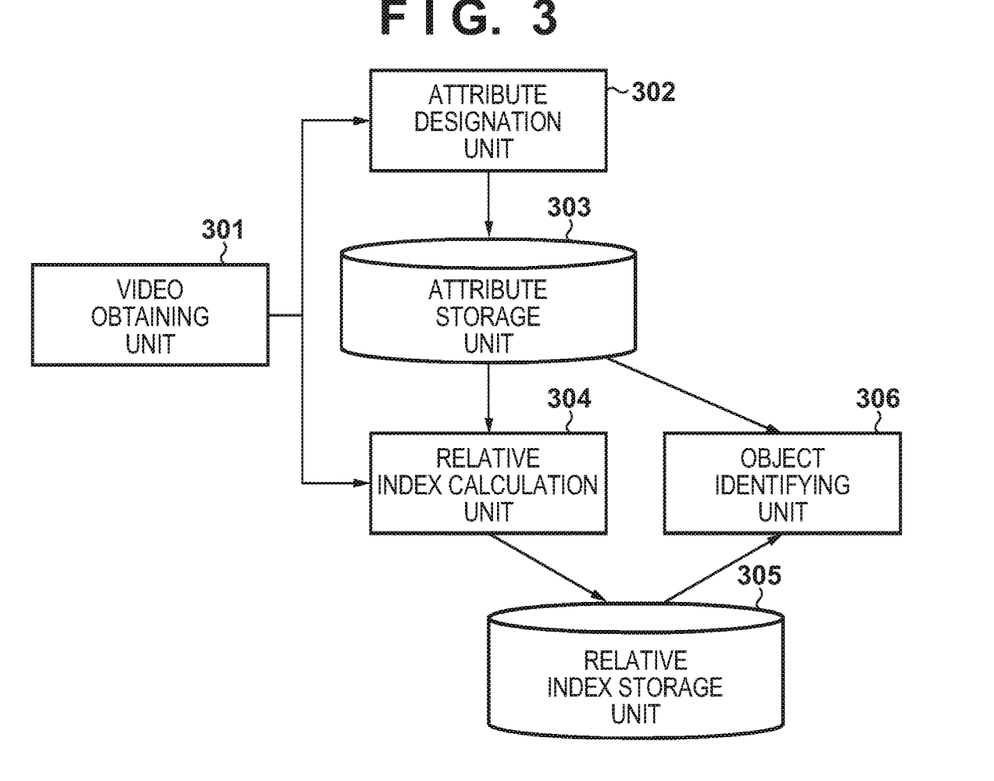
FIG. 3 is a block diagram showing the functional arrangement of the object identifying apparatus.

FIG. 3 is a view showing the functional arrangement of the object identifying apparatus 105. In this case, it is assumed that each functional unit of the object identifying apparatus 105 is implemented as an application that operates on an operating system. A video obtaining unit 301 receives the captured videos obtained by the image capturing apparatuses 101 to 103 via the network 104, and obtains them as videos of a processing target.

An attribute designation unit 302 designates an attribute of a background object common to cameras (to be referred to as a common background object hereinafter). Common background objects include, for example, a floor, wall, door, and shelf. Attributes include a color, luminance, height, and width. An attribute storage unit 303 includes the RAM 203 and the secondary storage device 204, and stores an attribute of a common background object which is designated by the attribute designation unit 302 for each camera. The attribute designation unit 302 will be described in detail later with reference to FIGS. 4 and 7.

A relative index calculation unit 304 derives a relative index from attribute information extracted from an object in a captured video obtained by the video obtaining unit 301 and a common background object. A relative index storage unit 305 is constituted by the RAM 203 and the secondary storage device 204 and stores the relative index calculated by the relative index calculation unit 304 in association with the camera and the object corresponding to the calculation. The relative index calculation unit 304 will be described in detail later with reference to FIGS. 5 and 10. An object identifying unit 306 identifies an object across the cameras based on a relative index. The object identifying unit 306 will be described in detail later with reference to FIGS. 6 and 11.

Figure 4:
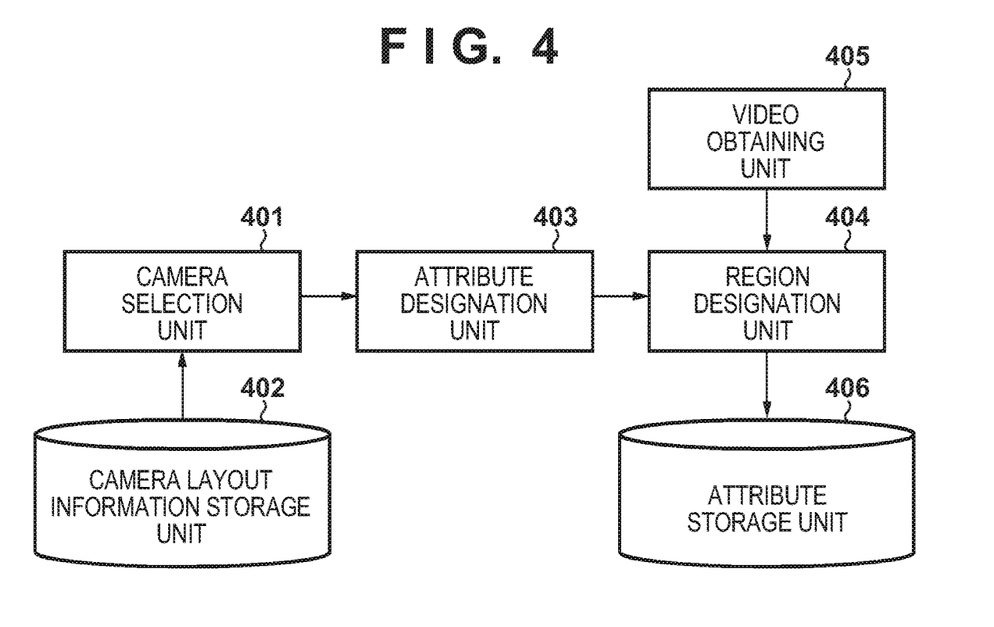
FIG. 4 is a block diagram showing the detailed arrangement of an attribute designation unit.

FIG. 4 shows the detailed arrangement of the attribute designation unit 302. Note that in order to clarify the sequence of data, FIG. 4 shows again some of the functional units shown in FIG. 3. More specifically, a video obtaining unit 405 is a functional unit identical to the video obtaining unit 301 in FIG. 3. An attribute storage unit 406 is a functional unit identical to the attribute storage unit 303 in FIG. 3.

A camera selection unit 401 selects a camera as a target for designating a common background object, based on a user instruction and the like issued via the input device 205. A camera layout information storage unit 402 stores camera layout information (placement information of cameras on a map). The camera layout information storage unit 402 is constituted by the RAM 203 and the secondary storage device 204.

An attribute designation unit 403 designates an attribute of a common background object in accordance with an instruction issued by the user via the input device 205. A region designation unit 404 designates an image region of a common background object in the screen of each camera which is selected by the camera selection unit 401 upon receiving an instruction issued by the user via the input device 205.

Figure 5:
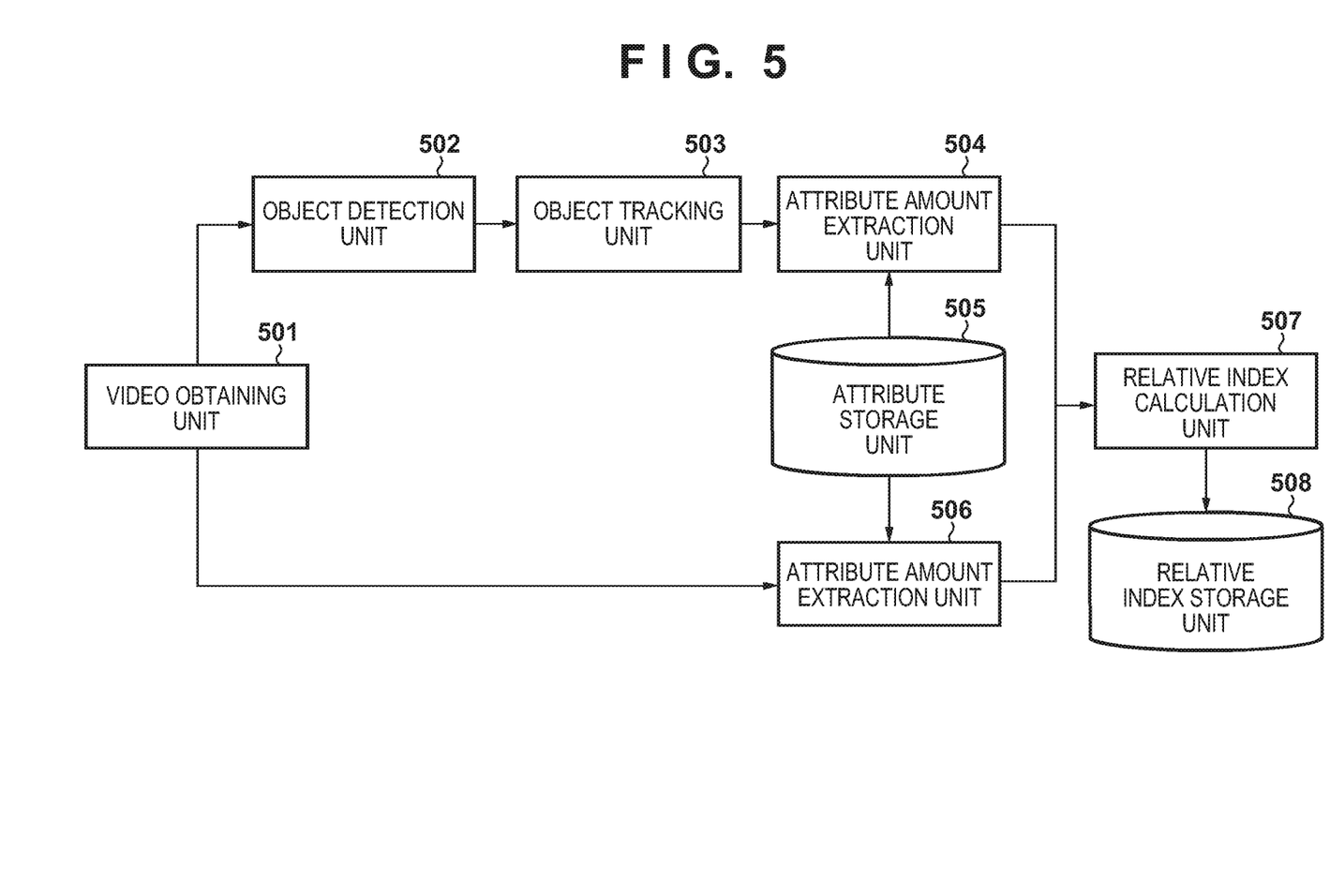
FIG. 5 is a block diagram showing the detailed arrangement of a relative index calculation unit.

FIG. 5 shows the detailed arrangement of the relative index calculation unit 304. Note that in order to clarify the sequence of data, FIG. 5 shows again some of the functional units shown in FIG. 3. More specifically, a video obtaining unit 501 is a functional unit identical to the video obtaining unit 301 in FIG. 3. An attribute storage unit 505 is a functional unit identical to the attribute storage unit 303 in FIG. 3. A relative index storage unit 508 is a functional unit identical to the relative index storage unit 305 in FIG. 3.

An object detection unit 502 detects an image region of an object from a video obtained by the video obtaining unit 501. An object tracking unit 503 tracks a detected predetermined object in a video by associating an object region in a current frame image detected by the object detection unit 502 with an image region of the object detected in a preceding frame image.

An attribute amount extraction unit 504 extracts the attribute amount of an object from a video. More specifically, the attribute amount extraction unit 504 extracts attribute information from an image region of an object which is detected by the object detection unit 502, and calculates an attribute amount (attribute value) indicated as a numerical value. Attribute information includes the average color, mode color, average luminance, mode luminance, height, and width of an object. Note that an attribute to be obtained by each camera is decided by referring to the attribute storage unit 505 (to be described later).

An attribute amount extraction unit 506 extracts an attribute amount of a common background object from a video. More specifically, the attribute amount extraction unit 506 extracts attribute information of a common background object in accordance with a position in a frame of an object, and calculates an attribute amount (attribute value) indicated as a numerical value. Like the attribute amount extraction unit 504, the attribute amount extraction unit 506 decides the type of attribute obtained by each camera by referring to the attribute storage unit 505.

A relative index calculation unit 507 derives a relative index for each object in a camera's video based on an attribute amount of an object and an attribute amount of a common background object near the object.

Figure 6:
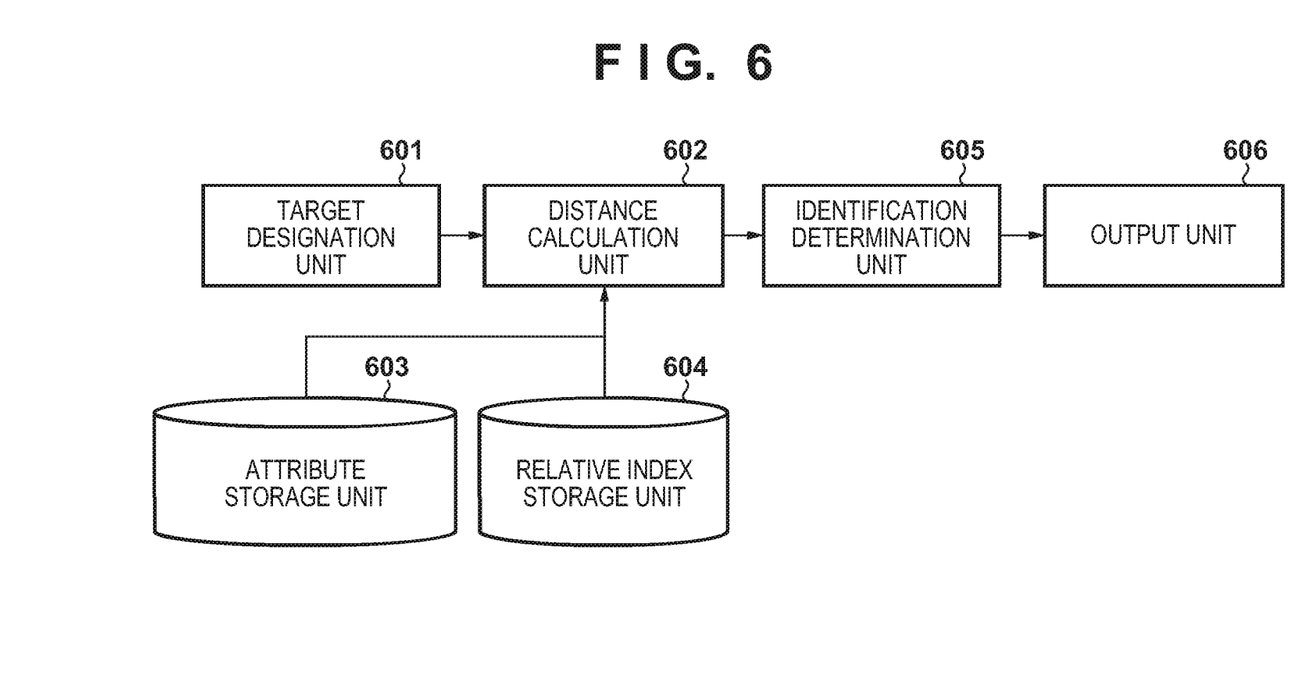
FIG. 6 is a block diagram showing the detailed arrangement of an object identifying unit.

FIG. 6 shows the detailed arrangement of the object identifying unit 306. Note that in order to clarify the sequence of data, FIG. 6 shows again some of the functional units shown in FIG. 3. More specifically, an attribute storage unit 603 is a functional unit identical to the attribute storage unit 303 in FIG. 3. A relative index storage unit 604 is a functional unit identical to the relative index storage unit 305 in FIG. 3.

A target designation unit 601 designates an object as a target subjected to object identifying processing, based on an instruction issued by the user via the input device 205. A distance calculation unit 602 calculates the distance between a relative index of an object which is designated by the target designation unit 601 and a relative index of an object in a current camera's video.

An identification determination unit 605 identifies an object based on a calculated inter relative index distance. An output unit 606 is formed from the display device 206 and displays an object identifying result to present it to the user.

<Operation of System>

Processing to be performed at the time of camera installation before the operation of the object identifying system will be described first. More specifically, this is processing for designating an attribute of a background object common to a plurality of cameras.

Figure 7:
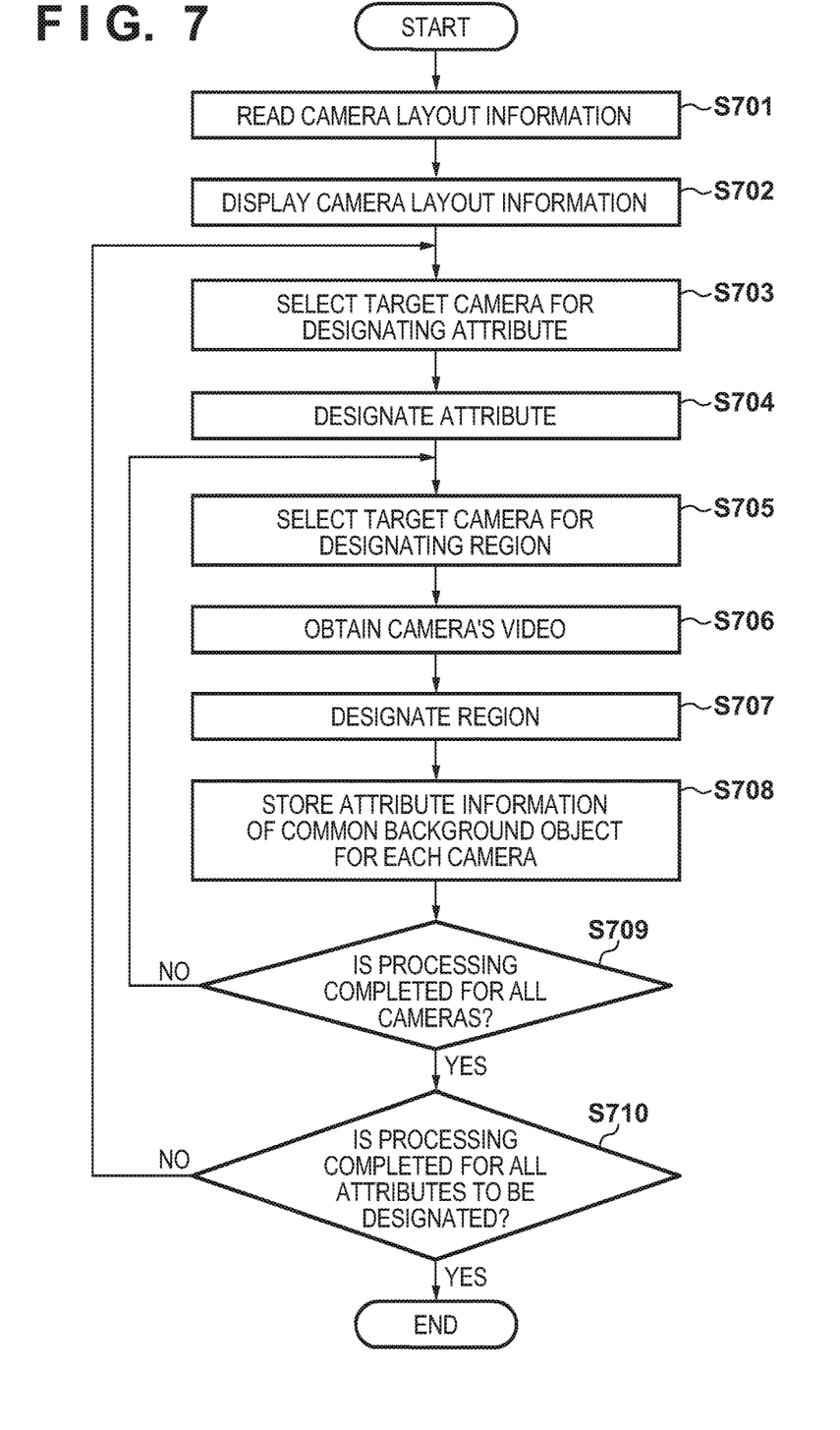
FIG. 7 is a flowchart for designating an attribute of a common background object.

FIG. 7 is a flowchart for designating an attribute of a common background object.

In step S701, the camera selection unit 401 reads camera layout information from the camera layout information storage unit 402. In this case, camera layout information is information indicating how a plurality of cameras are arranged in a predetermined area as a monitoring target. More specifically, such information includes camera IDs, coordinates on an area (map), and shooting directions.

Figure 8:
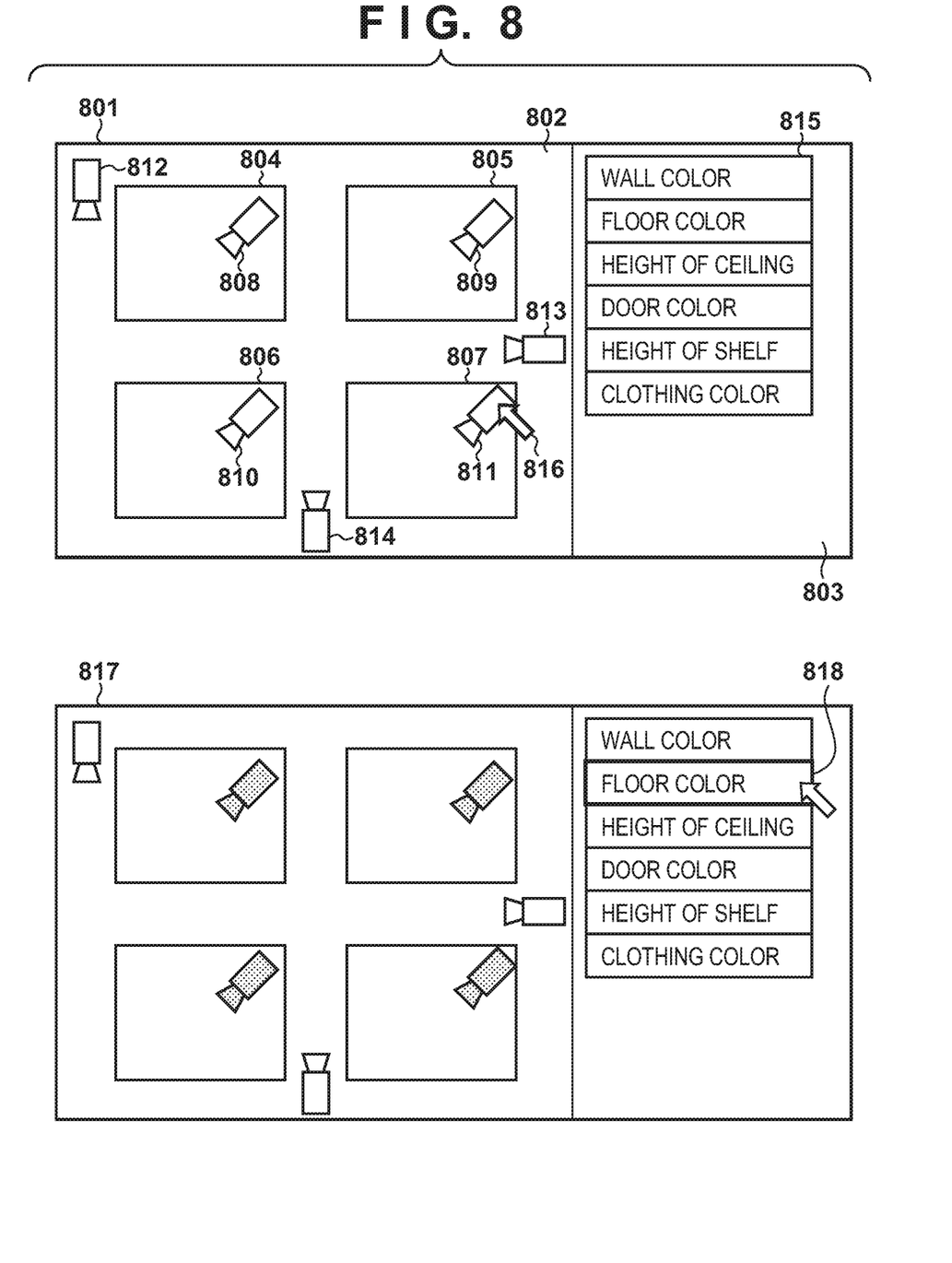
FIG. 8 is a view showing a display example when an attribute of a common background object is designated.

In step S702, the camera selection unit 401 displays read camera layout information to the user. FIG. 8 shows a display example at the time of designating an attribute of a common background object.

A display screen 801 includes a screen 802 for displaying a camera layout and a screen 803 for displaying an attribute type list (to be described later). More specifically, the map of an area where cameras are arranged is displayed on the screen 802. In this case, rooms (rectangles 804 to 807) and hallways (other regions) are displayed. Icons 808 to 814 represent cameras. The position and direction of each camera are expressed based on camera layout information. For example, the icon 808 indicates that a camera is installed at the upper right corner of the room 804 and faces in a lower left direction (when the upward direction coincides with the north direction, the camera is installed at the north east corner of the room 804 and faces in the south west direction).

In step S703, the camera selection unit 401 selects a camera as a target for designating an attribute of a background object, based on an input from the user. The user can designate each camera icon by moving a cursor 816 by operating the mouse as the input device 205.

A display screen 817 indicates a display example in a state in which four cameras are selected. If the user knows that the floors of the rooms indicated by the rectangles 804 to 807 have the same color, he/she selects the four cameras (icons 808 to 811) installed in the rooms. An icon filled in with black indicates that the camera corresponding to the icon is being selected.

According to the above description, camera layout information is digitized and stored in a storage unit. However, this is not exhaustive. For example, the camera selection unit 401 may be configured to receive such information from the user via the input device 205. For example, the user may refer to a paper drawing held with his/her hand to input only a written camera ID. The camera ID selected in the above manner may be temporarily stored in the RAM 203.

In step S704, the attribute designation unit 403 designates an attribute of a common background object which is input from the user. The screen 803 is a designation window for attributes of a common background object. The attribute designation unit 403 reads the attributes of the common background object which are stored in the system in advance, and displays the read attributes as a list 815. The display screen 817 indicates a state in which "floor color" is designated (surrounded by a thick line 818) via the cursor 816. This indicates that the attribute "floor color" is designated with respect to all the cameras selected in step S703. The selected camera ID is temporarily stored in the RAM 203 in association with the attribute ID set for the selected camera ID in advance.

In step S705, the region designation unit 404 receives the designation of an image region of the common background object in the screen in accordance with an input from the user, and hence selects a target camera. The user selects one of the four icons (the cameras selected in step S703) displayed in black on the display screen 817 by using the cursor 816.

Figure 9:
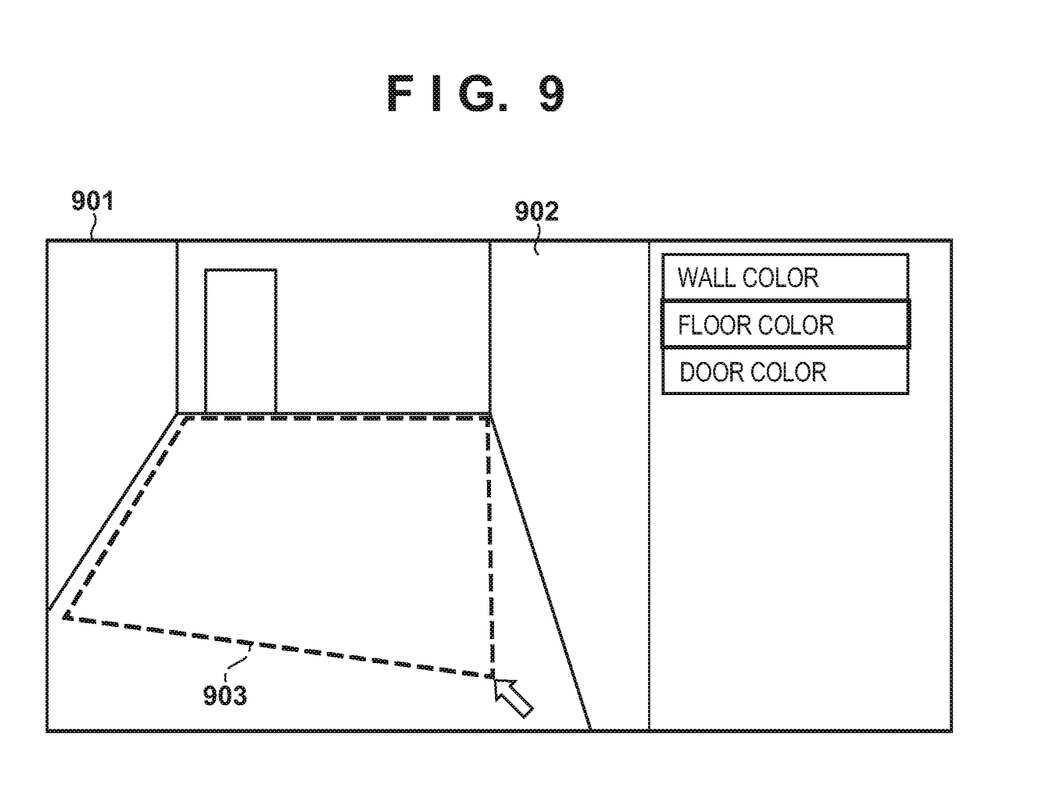
FIG. 9 is a view showing a display example when a region of a common background object is designated.

In step S706, based on the camera ID associated with the icon selected in step S705, the video obtaining unit 405 obtains a camera's video via the network 104. An obtained camera's video 902 is displayed on the screen of the display device 206. FIG. 9 is a view showing a display example at the time of designating a region of a common background object.

In step S707, the region designation unit 404 receives a designation of a region of a common background object in the screen. Referring to FIG. 9, a dotted rectangle 903 indicates a designated region. The designated region indicates a state in which "floor" is designated. In this case, the region is designated as a polygonal shape. If the floor has a uniform color, it is possible to use a method of designating the region of the floor with one point. In this case, adjacent pixels continuing from the designated point are searched, and a group of pixels similar in color may be used as a floor region.

In step S708, the region designation unit 404 stores attribute information of the common background object for each camera in the attribute storage unit 406. More specifically, the region information designated in step S707 is stored in association with the camera ID of the corresponding camera and the attribute ID of the background object.

In step S709, it is determined whether the processing in steps S705 to S708 is completed with respect to all the cameras designated in step S703. If NO in step S709, the process returns to step S705. In step S710, it is determined whether common background object designation processing is completed. For example, it is determined whether there is any other attribute to be designated as an attribute of the common background object. If YES in step S710, the process returns to step S703. If the common background object designation processing is completed, the processing is terminated.

With the above processing, with respect to the background object common to the plurality of cameras, the correspondence relationship between the cameras, the background object attributes, and the background object regions in the respective screens which are associated with each other is stored.

Processing to be performed at the time of operating the object identifying system will be described next. More specifically, this processing includes processing for calculating a relative index (FIG. 10) and processing for identifying an object (FIG. 11).

Figure 10:
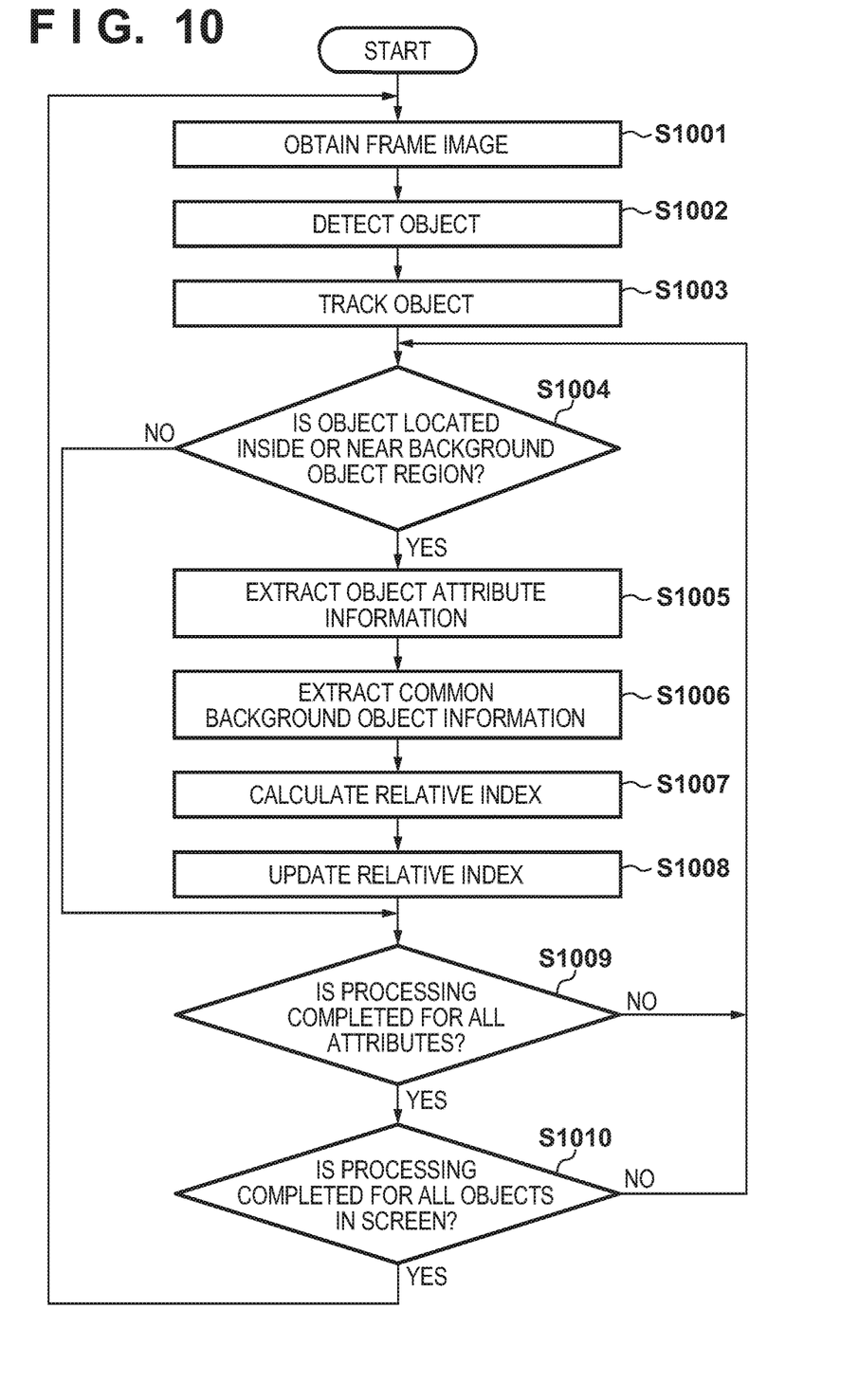
FIG. 10 is a flowchart showing calculation processing for a relative index.
Figure 11:
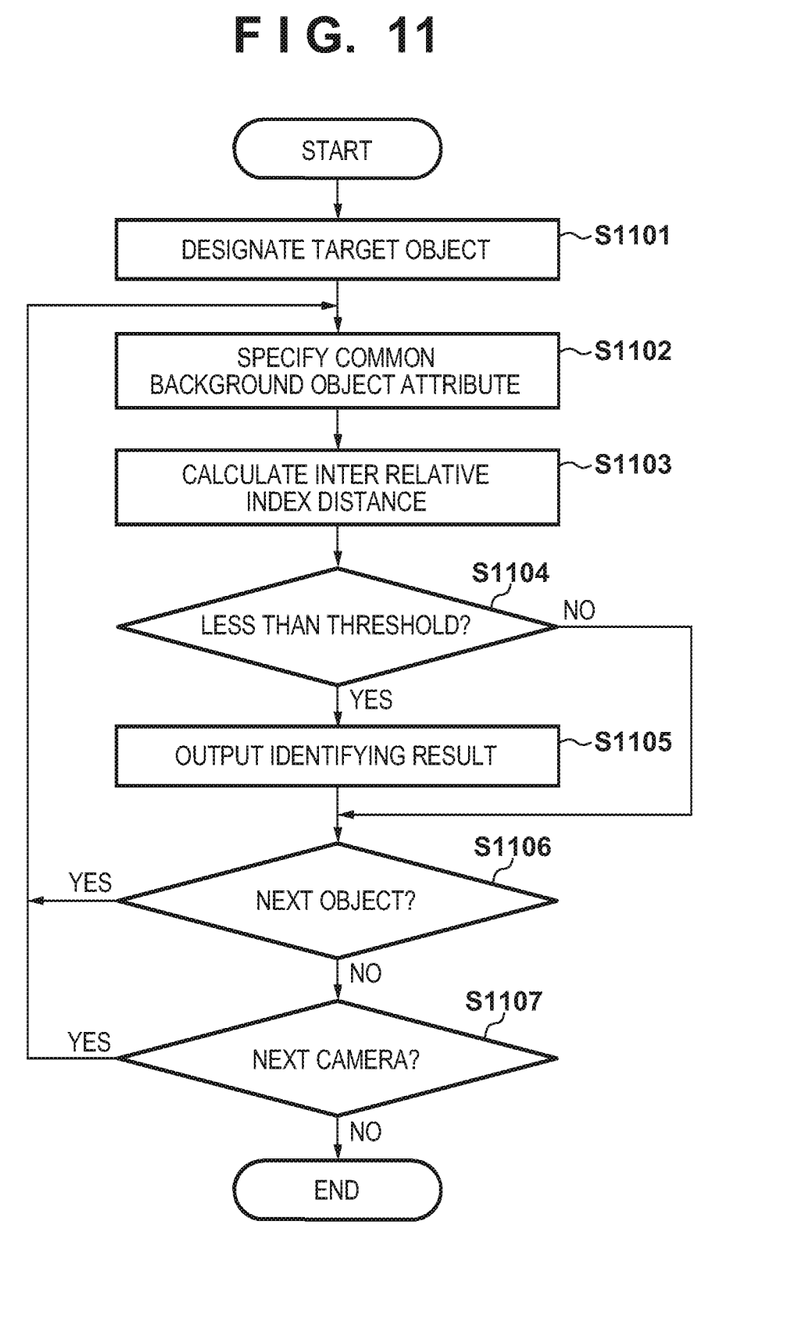
FIG. 11 is a flowchart showing identifying processing for an object.

FIG. 10 is a flowchart showing relative index calculation processing. Although FIG. 10 shows processing for one camera, similar processing is performed for all the cameras (the image capturing apparatuses 101 to 103 in this case) on the network.

In step S1001, the video obtaining unit 501 obtains a camera's video as a current target for each frame image. Note that each image capturing apparatus possesses a camera ID unique to the apparatus. The frame ID is added as time information to a frame image.

In step S1002, the object detection unit 502 detects an object in a frame image. Concrete methods for object detection include a background difference based method of performing detection based on differences between an input video and a background model generated in advance from a video obtained by capturing only a background in advance. For example, there is available the technique disclosed in Stauffer C and Grimson W. E. L., "Adaptive background mixture models for real-time tracking", In Proceedings. 1999 IEEE Computer Society Conference on Computer Vision and Pattern Recognition (Cat. No PR00149), IEEE Comput. Soc. Part Vol. 2, 1999.

For example, US-2007-0237387 discloses another object detection technique. In this technique, a detection window having a predetermined size is scanned on an input image to perform two-class discrimination to determine whether a pattern image obtained by clipping an image in the detection window represents a person. In this discrimination, the discrimination accuracy is preferably increased using a discriminator obtained by effectively combining many weak discriminators using AdaBoost. In addition, such discriminators are connected in series to form a cascade detector. Each weak discriminator is formed by using HOG (Histograms of Oriented Gradients) feature amounts. The cascade detector removes pattern candidates that are not obviously an object on the spot by using simple discriminators on the preceding stage. The detector then performs discrimination for only other candidates by using complex discriminators having higher identifying performance on the subsequent stage to determine whether each candidate is a person. Note that in the description of this embodiment, an object is a person. However, the embodiment can also be applied to other objects (for example, a vehicle).

Using the above method makes it possible to detect an object region from a video. An object region is represented by, for example, the x-coordinates and the y-coordinates of two points including the upper left corner point and the lower right corner point of a rectangle surrounding a person, with an upper left point of a frame image being the origin. In addition, a mask image obtained by representing each pixel corresponding to a person by "1" and each of the remaining pixels by "0" may be added. Using a mask image can discriminate pixels other than those corresponding to a person, which are included in the pixels corresponding to the person when the object region is represented by a rectangle, from the pixels corresponding to the person.

In step S1003, the object tracking unit 503 performs tracking processing for determining to which object detected in each preceding frame the object detected in the current frame corresponds. Various tracking processing techniques are available. For example, there is available a method of associating the central position of an object region included in a preceding frame with the central position of an object region included in the current frame when the distance between the central positions is the shortest. In place of the above technique, any technique that can associate objects in frames with each other may be used. For example, there is available a pattern matching technique using an object region in a preceding frame as a collation pattern. The same object ID is assigned to objects associated with each other across frames.

In step S1004, the attribute amount extraction unit 504 refers to the attribute storage unit 505 to determine, based on background object region information associated with the processing target camera, whether the object is present in or near the background object region. The attribute amount extraction unit 504 can perform this determination by, for example, determining whether the center of gravity of the object is present in the background object region or within a predetermined distance. Alternatively, the attribute amount extraction unit 504 can perform this determination by determining whether the object region overlaps the background object region.

This determination is effective when a plurality of illuminations having different color temperatures are used in a room. Assume that a door color is designated as an attribute. In this case, when an object stands near the door, it can be assumed that the object is present under the same illumination conditions. In order to calculate a relative index for the object color based on the door color, the above determination is performed because the object and the door are present under the same illumination conditions.

In step S1005, the attribute amount extraction unit 504 extracts the attribute amount of the attribute designated by attribute information of the common background object for each camera from the object region upon determining in step S1004 that the object is present in or near the background object region.

In step S1006, the attribute amount extraction unit 506 extracts the attribute amount of the attribute designated by attribute information of the common background object for each camera from the background object region near the object region. In this case for example, being near an object region can be defined as a rectangle having a predetermined size which is located at a position spaced downward from the lower end of a rectangle representing an object region by a predetermined distance. When a background object region protrudes at the lower end, a rectangle predetermined distances away from the upper end, the right end, and the left end may be used. In addition, an overall image known as a super pixel image may be divided into small regions as a group of pixels having similar luminance or color, and a small region nearest to the object region may be used.

When a background object is a floor, it can be assumed that the background object is always present at the lower end of an object. In this case, an attribute amount of a common background object may be always extracted from a portion near the lower end of an object. In addition, when only a floor is to be used as a background object, the region designation processing in step S707 (the region designation unit 404) and the determination processing in step S1004 may be omitted.

An attribute of a common background object is obtained from a portion near an object region instead of an overall background object region, considering a case in which an attribute that can be extracted is not constant when, for example, different illumination environments are set in different places, as described above. If there is no need to consider such situations, an attribute may always be obtained from an overall background object region.

An attribute amount of a background object is obtained every time an object is detected in order to cope with changes in illumination over time such as changes in illumination outdoors from daytime to nighttime. Obviously, when illumination conditions remain the same indoors or no temporal change occurs as in the case of the height of a shelf, there is no need to obtain an attribute amount every time an object is detected. For example, an attribute amount may be obtained in advance when, for example, a camera is installed and may be stored in advance in association with attribute information of a common background object for each camera.

In step S1007, the relative index calculation unit 507 calculates a relative index from the object attribute amount and the common background object attribute amount. A relative index is a value relatively expressing attribute information of the object with reference to attribute information of the common background object. The following will exemplify a case in which a floor color is designated as an attribute. Assume that in this case, each pixel is defined by three channels including R, and B channels, each channel is expressed by an 8-bit value (0 to 255), and an attribute amount is expressed by the average color of a predetermined region.

Assume that a floor color is expressed by (R, G, B)=(125, 200, 100), and an object color is expressed by (R, G, B)=(135, 180, 150). If a relative index is expressed by a difference value with reference to the floor color, (R, G, B)=(+10, −20, +50). On the other hand, assume that image capturing is performed by another camera. In this case, when the R channel is enhanced, the floor color is expressed by (R, G, B)=(175, 200, 100). Because the R channel of the object color is enhanced, (R, G, B)=(185, 180, 150), and the relative index is expressed by (R, G, B)=(+10, −20, +50), no change occurs. Note that in this case, because the range of values of each channel is 0 to 255, a relative index ranges from −255 to +255. However, because the ranges of values of other attributes generally differ from each other, normalization is performed with 255, which is the maximum value (a value range is made to become −1 to +1). This makes it possible to perform determination in object identifying processing (to be described later) based on a combination of relative indices corresponding to a plurality of attributes.

According to the above description, although a difference value is used as a relative index, another type of value can be used as a relative index as long as it is a relative value of an object attribute amount with respect to a common background object attribute amount. For example, the ratio of an object color to a common background object color may be used as a relative index. As in the case of the above difference value, assume that a floor color is expressed by (R, G, B)=(125, 200, 100), and an object color is expressed by (R, G, B)=(135, 180, 150). In this case, a relative index using a ratio can be expressed by (R, G, B)=(135/125, 180/200, 150/100)=(1.08, 0.9, 1.5). In addition, assume that when image capturing is performed by another camera, the floor color is expressed by (R, G, B)=(175, 200, 100), and the object color is expressed by (R, G, B)=(185, 180, 150). At this time, a relative index using a ratio is expressed by (R, G, B)=(185/175, 180/200, 150/100)=(1.06, 0.9, 1.5). That is, the color that is an attribute value (the value of R) greatly changes, but a change in relative index is very small (0.02 in terms of R).

A case in which, for example, the height of a shelf is designated as a common background object will be described. Assume that an attribute amount is expressed by the distance between coordinates in a frame image. The distance in the frame image changes with a change in the field angle or shooting angle of the camera. However, the height of the object also changes in the same manner within the same camera, and hence the height represented by a relative index remains the same across cameras.

Using a relative index in the above manner makes it possible to always obtain a constant value from the same object even if an attribute amount of the object changes because of different illumination conditions between cameras. This eliminates the necessity to perform accurate calibration for luminance or color between cameras in advance or an operation for associating positions in a frame image with positions in a real space in advance.

In step S1008, the relative index calculation unit 507 updates the relative index stored in the relative index storage unit 508 to the currently calculated relative index. When a relative index is calculated for the first time, the current relative index is stored as relative index information in the relative index storage unit 508 in association with a camera ID, object ID, and attribute ID.

Assume that when a relative index is calculated for the next frame, there is a relative index having the same camera ID, the same object ID, and the same attribute ID. In this case, the relative index is updated by calculating the weighted mean of the values of the past and current relative indices. This is because a relative index obtained for each frame is sometimes affected by noise, and hence such an operation is performed to obtain a stable relative index by gradually reflecting the currently obtained relative index in the relative index obtained in the past. Obviously, for this purpose, another technique may be used. For example, relative indices corresponding to a plurality of frames are temporarily stored, and the mode value of the relative indices is obtained.

In step S1009, it is determined whether the processing in steps S1004 to S1008 is completed for all the background object attributes designated with respect to the camera currently designated as a target. If NO in step S1009, the process returns to step S1004. Note that when relative index values of a plurality of background object attributes are calculated with respect to the same object, the plurality of relative index values are stored in association with the same (camera ID) object ID in relative index information.

In step S1010, it is determined whether the processing in steps S1004 to S1009 is completed for all the objects in the current frame screen. If NO in step S1010, the process returns to step S1004. Note that when relative index values are calculated from a plurality of objects in the screen, the plurality of relative index values are stored in association with the same camera ID in relative index information.

With the above processing, relative indices are respectively calculated with respect to a plurality of objects captured by cameras and stored.

FIG. 11 is a flowchart showing object identifying processing. Identifying processing is processing for identifying an object by using the relative index calculated by the above calculation processing.

In step S1101, the target designation unit 601 designates an object as a target subjected to object identifying processing in accordance with an instruction from the user. For example, the user issues an instruction by using a mouse or the like of the input device 205 upon displaying a camera's video on the display device 206. The attribute ID of the target object and a relative index value are read from relative index information in the relative index storage unit 604 based on the designated object ID and temporarily stored in the RAM 203.

The distance calculation unit 602 then performs identifying processing (steps S1102 to S1107) for a camera other than the camera for which the target object has been designated. Note that immediately after a target object is designated, the object is likely to be displayed in the camera for which the designation has been made, and hence identifying processing may be performed after the target object falls outside the shooting range of the camera. Note that the processing in steps S1102 to S1106 is performed for each camera.

In step S1102, the distance calculation unit 602 refers to the attribute storage unit 603 to specify a background object attribute common to the two cameras, namely the camera for which the target object has been designated and another camera currently attracting attention. For example, assume that common background object attributes of the camera (camera ID=1) for which the target object is designated include a wall color (type ID=1), a floor color (type ID=2), and a door color (type ID=4). Assume also that common background object attributes of the camera (camera ID=2) currently attracting attention include a floor color (type ID=2) and a door color (type ID=4). In this case, the two attributes, namely the floor color (type ID=2) and the door color (type ID=4), which are represented by the common type IDs, can be specified as common background object attributes.

In step S1103, the distance calculation unit 602 calculates the inter relative index distance between the target object and the object in the camera other than the camera for which the target object has been designated. In the case described in step S1102, the types of background object attributes common to the two cameras are two attributes, namely the floor color (type ID=2) and the color the door (type ID=4), and hence the distance calculation unit 602 calculates the distance between the relative indices. For example, the following method is available as a distance calculation method. The absolute values of the differences in relative index between the respective attributes are obtained first. The sum of all the attribute difference values is then divided by the number of common background object attributes. The sum is divided by the number of common background object attributes because different background object attributes are common to the other two cameras. This processing makes the relative index distances calculated between any combinations of cameras fall within a predetermined range, thereby facilitating comparison.

In step S1104, the identification determination unit 605 determines whether the inter relative index distance is less than a predetermined threshold. If YES in step S1104, the process advances to step S1105. If NO in step S1104, the process advances to step S1106.

In step S1105, the identification determination unit 605 identifies an object with its inter relative index distance from the target object being less than the predetermined threshold as the same object, and the output unit 606 displays the identifying result to the user.

Figure 12:
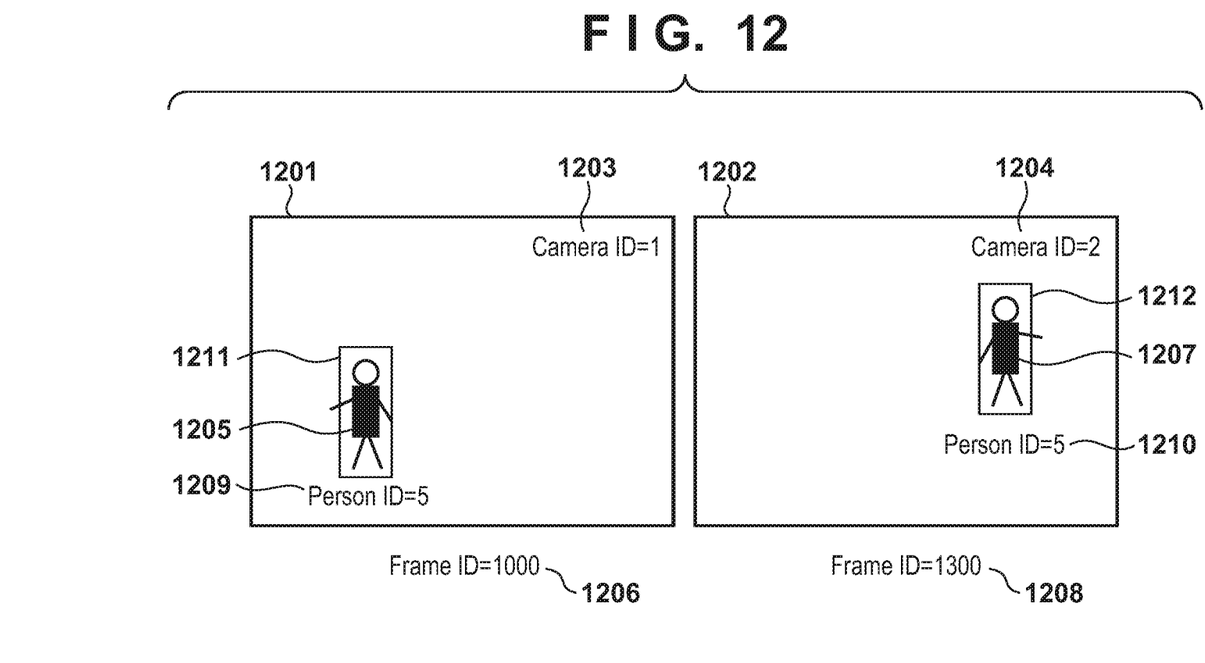
FIG. 12 is a view showing a display example of identifying processing results.

FIG. 12 shows a display example of identifying processing results. Screens 1201 and 1202 are screens respectively corresponding to camera IDs of "1" and "2". Camera ID indications 1203 and 1204 are respectively superimposed on the screens 1201 and 1202.

The screen 1201 exemplarily shows a video when the frame ID is 1000. This video includes an object 1205. A frame ID indication 1206 is displayed on a lower portion of the screen 1201. The screen 1202 exemplarily shows a video when the frame ID is 1300. This video includes an object 1207. A frame ID indication 1208 is displayed on a lower portion of the screen 1202.

If the objects 1205 and 1207 are identified as the same object, for example, the same object ID is additionally displayed as indicated by object ID indications 1209 and 1210. Alternatively, rectangles 1211 and 1212 having the same color may be displayed. Any arbitrary display method can be used as long as it allows the user to recognize that the same object is included in a specific portion of a specific camera's video.

In step S1106, it is determined whether the processing in steps S1102 to S1105 is completed for all the objects included in the video captured by the camera currently attracting attention. If NO in step S1106, the process returns to step S1102. In step S1107, it is determined whether the processing in steps S1102 to S1106 is completed for all the cameras to be processed. If NO in step S1107, the process returns to step S1102.

As has been described above, the first embodiment is configured to perform object identifying processing by using a relative index of an object attribute with reference to a background object attribute. This arrangement reduces the influences of differences in shooting conditions (illumination, camera model, field angle, and the like) between a plurality of cameras, and can perform accurate object identifying processing.

According to the above description, a "person" is designated as an object. However, the present invention can be applied to other types of objects such as a "vehicle". In addition, the above description has exemplified the arrangement configured to make the two apparatuses, namely the image capturing apparatus and the object identifying apparatus, separately perform processing. However, an arbitrary arrangement can be used. For example, an arrangement may be configured to make the image capturing apparatus perform only an image capturing operation and to transmit a video to a PC via a network so as to make the PC perform processing after the detection of an object. Furthermore, the above description has exemplified the mode of identifying an object with respect to a plurality of videos obtained by a plurality of image capturing apparatuses. However, the present invention can also be applied to a mode of identifying an object with respect to a plurality of videos obtained by a single image capturing apparatus at different times.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-150083, filed Aug. 2, 2017 which is hereby incorporated by reference herein in its entirety.

What is claimed is:

1. An image processing apparatus comprising:
an input unit configured to input a first captured video and a second captured video;
a first extraction unit configured to extract attribute values of image regions of background objects commonly included in the first captured video and the second captured video respectively from the first captured video and the second captured video;
a second extraction unit configured to extract attribute values of image regions of objects respectively included in the first captured video and the second captured video;
a deriving unit configured to derive a relative index of an attribute value of the image region of the object with reference to the attribute value of the image region of the background object, for the object included in each of the first captured video and the second captured video;
a distance calculation unit configured to calculate a distance between the relative index for the object included in the first captured video and the relative index for the object included in the second captured video; and
a detection unit configured to detect the same object included in the first captured video and the second captured video based on the distance calculated by the distance calculation unit.

2. The apparatus according to claim 1, wherein when the distance is less than a predetermined threshold, the detection unit determines that the objects are the same object.

3. The apparatus according to claim 1, wherein the first captured video and the second captured video are captured videos obtained by a single image capturing apparatus at different times.

4. The apparatus according to claim 1, wherein the first captured video and the second captured video are captured videos obtained by different image capturing apparatuses.

5. The apparatus according to claim 1, wherein the second extraction unit extracts an attribute value of an image region of an object from a frame image of a plurality of frame images included in a captured video and in which the object is located inside or near an image region of the background object.

6. The apparatus according to claim 1, wherein the first extraction unit extracts an attribute value of a region, of an image region of the background object in the captured video, which is located near an image region of the object.

7. The apparatus according to claim 1, further comprising a reception unit configured to receive a designation of an image region of the background object in each of the first captured video and the second captured video.

8. The apparatus according to claim 7, further comprising:
a first selection unit configured to select image capturing apparatuses, of a plurality of image capturing apparatuses configured to capture a predetermined region, which capture the first captured video and the second captured video; and
a second selection unit configured to select an attribute of the background object,
wherein the reception unit receives a designation of an image region corresponding to an attribute selected by the second selection unit with respect to videos respectively captured by the image capturing apparatuses selected by the first selection unit.

9. The apparatus according to claim 1, wherein the attribute value includes a value associated with at least one of color, luminance, and length.

10. A control method for an image processing apparatus, the method comprising:
inputting a first captured video and a second captured video;
extracting attribute values of image regions of background objects commonly included in the first captured video and the second captured video respectively from the first captured video and the second captured video;
extracting attribute values of image regions of objects respectively included in the first captured video and the second captured video;
deriving a relative index of an attribute value of the image region of the object with reference to the attribute value of the image region of the background object, for the object included in each of the first captured video and the second captured video;
calculating a distance between the relative index for the object included in the first captured video and the relative index for the object included in the second captured video; and
detecting the same object included in the first captured video and the second captured video based on the distance calculated by the distance calculating step.

11. A non-transitory computer-readable recording medium storing a program that causes a computer to function as an image processing apparatus comprising:
an input unit configured to input a first captured video and a second captured video;
a first extraction unit configured to extract attribute values of image regions of background objects commonly included in the first captured video and the second captured video respectively from the first captured video and the second captured video;
a second extraction unit configured to extract attribute values of image regions of objects respectively included in the first captured video and the second captured video;
a deriving unit configured to derive a relative index of an attribute value of the image region of the object with reference to the attribute value of the image region of the background object, for the object included in each of the first captured video and the second captured video;
a distance calculation unit configured to calculate a distance between the relative index for the object included in the first captured video and the relative index for the object included in the second captured video; and
a detection unit configured to detect the same object included in the first captured video and the second captured video based on the distance calculated by the distance calculation unit.

* * * * *